United States Patent [19]

Isberg et al.

[11] 3,873,448

[45] Mar. 25, 1975

[54] MAGNETIC SEPARATOR

[75] Inventors: Reuben Albert Isberg, Berkeley; Hermas Nelson Beaudet, Concord; William Harold Avery, Jr., El Cerrito, all of Calif.

[73] Assignee: Tenneco Chemicals, Inc., Saddle Brook, N.J.

[22] Filed: May 9, 1973

[21] Appl. No.: 358,469

[52] U.S. Cl............... 210/222, 209/223 R, 209/232
[51] Int. Cl............................................ B01d 35/06
[58] Field of Search........ 209/220, 214, 223 R, 232; 210/222, 223, 42

[56] References Cited
UNITED STATES PATENTS

| | | | |
|---|---|---|---|
| 1,491,600 | 4/1924 | Lernow, Jr...................... | 210/222 X |
| 2,329,893 | 9/1943 | Girard................................. | 210/222 |
| 2,430,157 | 11/1947 | Byrd, Jr. ............................ | 210/222 |
| 2,452,220 | 10/1948 | Bower................................ | 210/222 |
| 3,539,509 | 11/1970 | Gunter et al....................... | 210/222 |
| 3,567,026 | 3/1971 | Kolm ................................. | 210/222 |
| 3,581,898 | 6/1971 | Tyrrell............................... | 210/222 |
| 3,608,718 | 9/1971 | Aubrey, Jr. et al................. | 209/223 |
| 3,627,678 | 12/1971 | Marston............................. | 209/214 |
| 3,633,751 | 1/1972 | Stevens............................. | 210/222 |
| 3,770,629 | 11/1973 | Nolan ............................... | 210/222 |

OTHER PUBLICATIONS

Polgreen, New Applications of Modern Magnets, pp. 228–233, MacDonald, London, 5/2/66, Sci. Lib., QC, 757 P6.

Harnwell, Principles of Electricity and Magnetism, pp. 384–389, McGraw-Hill, New York, 1938, Sci. Library - QC 518 H27.

Primary Examiner—Theodore A. Granger
Attorney, Agent, or Firm—Evelyn Berlow

[57] ABSTRACT

A magnetic separator is disclosed having particular utility in separating ferromagnetic materials with sizes on the order of microns from viscous fluids having viscosities measured in poises. The separator utilizes a ferromagnetic filter preferably in the form of a bed of ferromagnetic particles through which the fluid is passed and a magnetic field established in the bed transversely to the direction of fluid flow.

7 Claims, 4 Drawing Figures

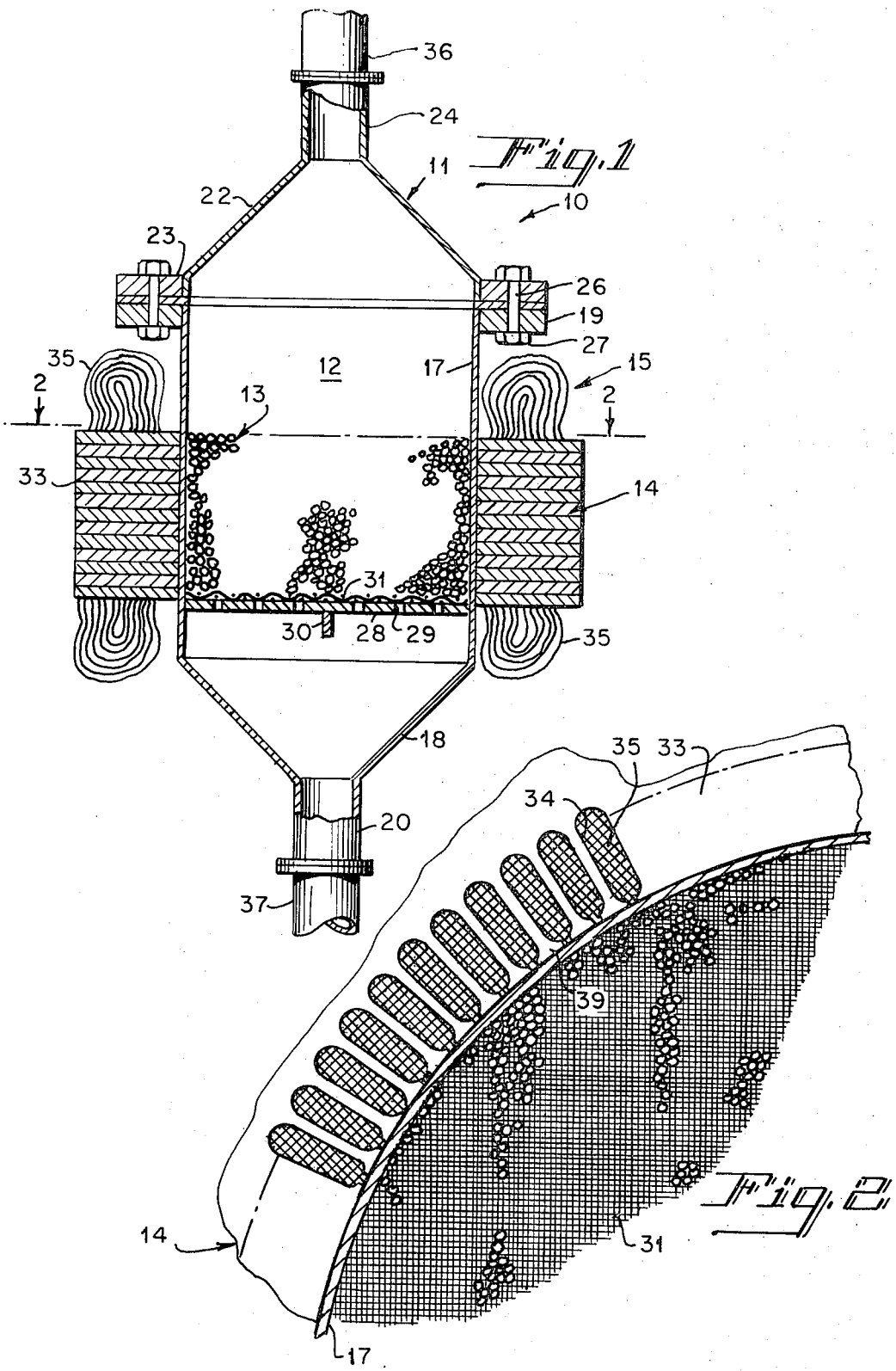

MAGNETIC SEPARATOR

This invention relates to magnetic separation and in particular provides a magnetic separator having utility in removing ferromagnetic particles from fluids and which is applicable to the removal of particles having sizes on the order of microns from fluids having viscosities measured in poises.

The basic principles of magnetic separation are well known and insofar as relevant to this invention involve the passing of a fluid containing ferromagnetic particles, or the like, through a magnetic field in which the ferromagnetic particles are collected, and thus removed, at least in part, from the fluid. Commonly the magnetic field is applied axially by winding an electromagnetic coil about a tube or vessel through which the fluid is passed. The amount of tractive force which can be developed in such a separator is increased by employing a ferromagnetic filter positioned in the field and by employing a ferromagnetic return frame. Typical of such prior separators is that disclosed in U.S. Pat. No. 3,627,678 to Marston and Nolan.

The prior magnetic separators are subject to certain limitations. Thus the efficiency of the separators heretofore known is limited; as the applied voltage is increased to increase tractive force there is a limit on maximum removal of ferromagnetic particles which can be achieved. In other words, there comes a point in which the consumption of additional power to increase the intensity of the magnetic field results in a lessening in the efficiency of removal of ferromagnetic particles. This occurs because as the field strength is increased its distribution becomes non-uniform and a situation analogus to channeling in a mechanical filter develops. As a result such separators are limited to handling fluids of relatively low viscosity. This is particularly so because as viscosity increases the pressure drop increases in a limiting manner and the drag exerted by the fluid resisting separation of particles also increases.

It is thus a principal object of this invention to provide a magnetic separator in which highly increased magnetic field intensity can be achieved in a uniform manner, thus enabling the separator to be useful in efficient removal of small ferromagnetic particles from viscous fluids as well as from fluids of low viscosity.

It is a further object of this invention to provide a magnetic separator of relatively small size and capable of large through-puts.

It is another object of this invention to provide a magnetic separator having a uniform magnetic field in the zone of separation.

These and other objects of this invention are basically achieved by a construction designed to provide a magnetic field which extends transversely to the direction of fluid flow through the separator. Such a magnetic field is achieved by a combination of a ferromagnetic filter within a chamber through which the fluid flows and an electromagnet having a gap which surrounds the chamber adjacent the location of the filter. An electromagnetic coil is positioned relative to the electromagnet, such that when the coil is energized a magnetic circuit is established which crosses the gap and hence the filter.

For a more complete understanding of the practical application of this invention, reference is made to the appended drawings in which:

FIG. 1 is a vertical section through a magnetic separator in accordance with this invention;

FIG. 2 is a cross-section taken at line 2—2 in FIG. 1;

Figure 3:
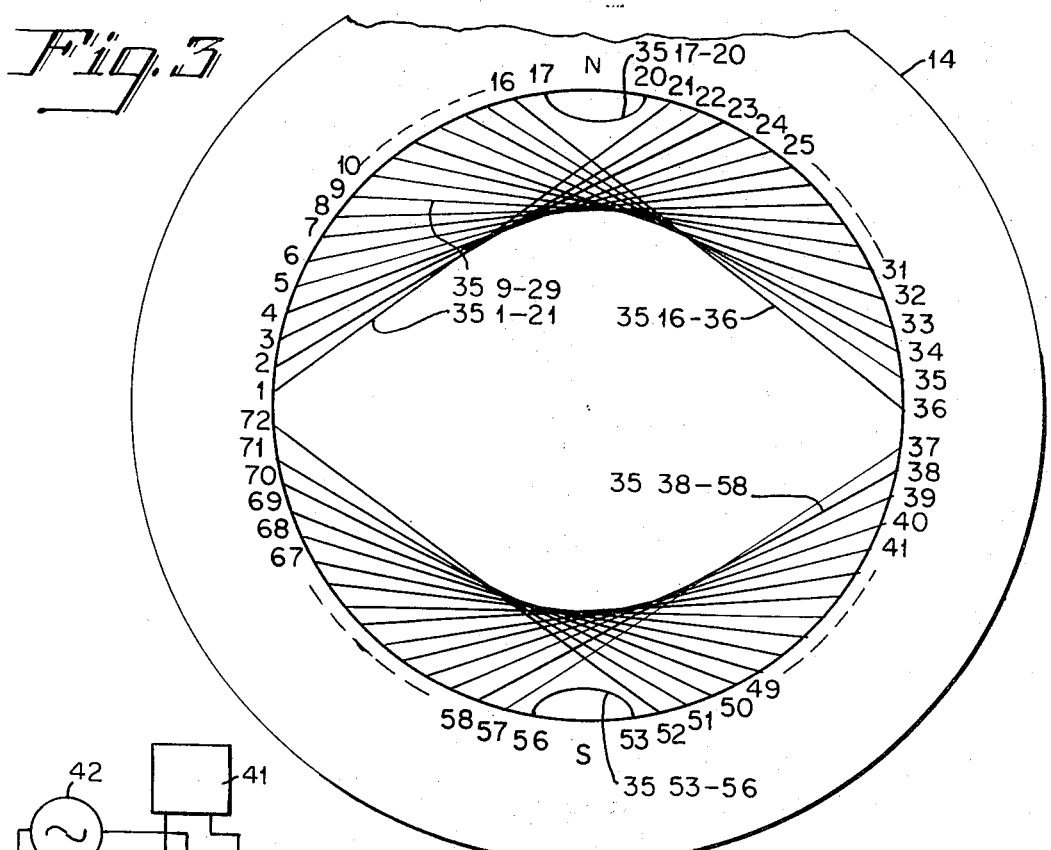
FIG. 3 is a diagrammatic representation of the winding of the electromagnetic coil in the separator shown in FIGS. 1 and 2.

Referring to FIGS. 1 and 2, the reference numeral 10 designates a magnetic separator in accordance with this invention. Magnetic separator 10 basically includes a vessel 11 enclosing a chamber 12 which houses a ferromagnetic filter 13 and which is surrounded by an electromagnet 14, having an electromagnetic coil 15 wound on electromagnet 14 to set up two magnetic poles when energized.

Vessel 11 is constructed of stainless steel and includes a cylindrical tank 17 having a conical bottom 18 welded to tank 17, a heavy annular flange 19 welded to the upper end of tank 17 and a flanged pipe 20 depending from the bottom of cone 18. Vessel 11 further includes a conical cap 22 having a heavy flange at its lower, wider end 23 and an upstanding flanged pipe 24 secured to its upper end. Cap 22 is secured on the open, upper end of tank 17 by bolts 26 and nuts 27 which secure flanges 19 and 23 together. Suitable gasketing is provided to insure a fluid tight seal between flanges 19 and 23. Near the lower end of cylindrical tank 17 the tank is provided with a filter bed support plate 28. Plate 28 is circular and has its circumference welded to the inner surface of tank 17. In addition plate 28 is apertured, as at 29, generally across the entire surface of plate 28. Additionally, a rib 30 is welded across tank 17 and to plate 28 to provide central support for plate 28. Immediately above plate 28 is a wire mesh screen 31 having a relatively fine mesh, e.g., 30–50, the function of which together with plate 28 is to support filter 13. Filter 13 consists of a bed of ferromagnetic particles, such as tacks, shot, balls or the like, preferably 14 to 16 mesh steel shot.

Electromagnet 14 is an induction motor stator and includes a stack of identical, thin, annular silicon iron laminae 33 sized to fit snugly about cylindrical tank 17 adjacent the location of filter 13. Electromagnet 14 is thus provided with a number of radial slots extending lengthwise through the frame in the inner surface of the frame and which are disposed about such inner surface at arcuate intervals. Thus each lamina 33 includes radial slots about its inner edge and the stack of laminae are arranged with such slots in registry to define slots 34 in frame 13.

Coil 15 is formed of a number of separate windings 35, each winding being associated physically with a pair of slots 34. Windings 35 are further grouped, such that coil 15 when energized sets up a bipolar magnetic field across electromagnet 14, thus electromagnet 14 itself serves primarily as a return frame and its center as a gap in a magnetic circuit. To accomplish this electromagnet 14 is considered as divided into two halves by a plane through its axis and thus perpendicular to laminae 33. Each winding 35 is wound about a pair of slots on one side of the plane (and hence of electromagnet 14), or the other. Coil 15 is connected to a direct current source, such that windings 34 on one side of electromagnet 14 have a common polarity and windings 34 on the opposite side have a common polarity, but opposing that of the first side, such that north and south poles are presented on opposite sides of the gap. It is preferred that windings 35 be wound about non-adjacent slots 34 and that the windings on a side of electromagnet 14 overlap slots 34 in which other windings 35 on the same side of electromagnet 14 are wound.

In operation pipe 24 is connected to an inlet fitting 36 and pipe 20 is connected to an outlet fitting 37 for delivery of fluid containing contaminating electromagnetic particles through inlet fitting 36 into chamber 12 and hence out through outlet fitting 37. Coil 15 is energized with direct current to establish a magnetic field transversely to the direction of fluid flow through filter 13. Small ferromagnetic particles contained in the fluid are thus attracted to the steel shot or other particles constituting filter 13 and adhere to them being thereby removed from the fluid passing through separator 10. When the quantity of removed ferromagnetic particles is such that efficient separation no longer takes place, for example, pressure drop becomes excessive or filtration efficiency goes down, fluid flow is discontinued. The DC potential on coil 15 is then removed, and an AC potential is applied to coil 15. This is feasible because electromagnet 14 is laminated. The resultant alternating magnetic field causes demagnetization of the particles forming filter 13 and of the particles which were separated from the fluid. Such separated particles are then readily removed by backflushing with a viscous fluid and the separator is then again ready for reuse. Typically the flushing fluid can be of the same as that being treated.

A magnetic separator in accordance with this invention was constructed to remove small ferromagnetic particles, such as tramp iron, from viscous fluids in accordance with the following fluid regime parameters:

| | |
|---|---|
| Fluid density (pounds per gallon) | 7–11 |
| Fluid viscosity (poise) | 1–50 |
| Flow rate (gallons per hour) | 10–500 |
| Temperature (degrees Fahrenheit) | 100–250 |
| Pressure drop across separator (psi) | 5–75 |
| Initial tramp iron loading (parts per million) | 15–100 |
| Desired percent tramp iron removal | 90–100 |
| Tramp iron particle size (microns) | 5–50 |

Electromagnet 14 in this construction had an 11 inch inside diameter, 22 inch outside diameter, and was 6¼ inches thick having 72 equally spaced slots 34 which were 1.276 inch deep, 0.334 inch maximum width and 0.136 inch wide slot opening. The teeth 39 formed in the laminae 33 were 0.24 inch wide between slots 34 and their faces were 0.375 inch wide.

Filter 13 was a layer of seven inches thickness of one-sixteenth inch steel shot.

Windings 35 of coil 15 were disposed on two sides of electromagnet 14 with the windings on each side disposed between non-adjacent slots in such a manner that the windings overlap on each side. In this case referring to FIG. 3, counting slots 34 sequentially about electromagnet 14 from 1 to 72, windings 35 were disposed on one side of electromagnet 14 with a first winding $35_{1-21}$ wound about slots 1 and 21, a second winding $35_{2-22}$ about slots 2 and 22, and so forth terminating in a winding $35_{16-36}$ between slots 16 and 36 to give a total of 16 windings on one side. A 17th winding $35_{17-20}$ was provided to attain as many ampere turns as possible by having a short winding between slots 17 and 20. No windings were disposed in slots 18 and 19. Similarly, a winding $35_{37-57}$ was disposed on the other side of frame 14 between slots 37 and 57. Another winding $35_{38-58}$ was disposed between slots 38 and 58, and so forth through a 16th winding $35_{52-72}$ between slots 52 and 72. A 17th winding $35_{53-56}$ was similarly wound between slots 53 and 56, and slots 54 and 55 were left empty. Windings 35 were of 16 AWG copper wire insulated for 220°C and typically were 90 turns of Class 220C Allex film insulated wire (1.3 ohms at room temperature), except winding $35_{17-20}$ and $35_{53-56}$ which had about half the amount of wire and resistance.

Figure 4:
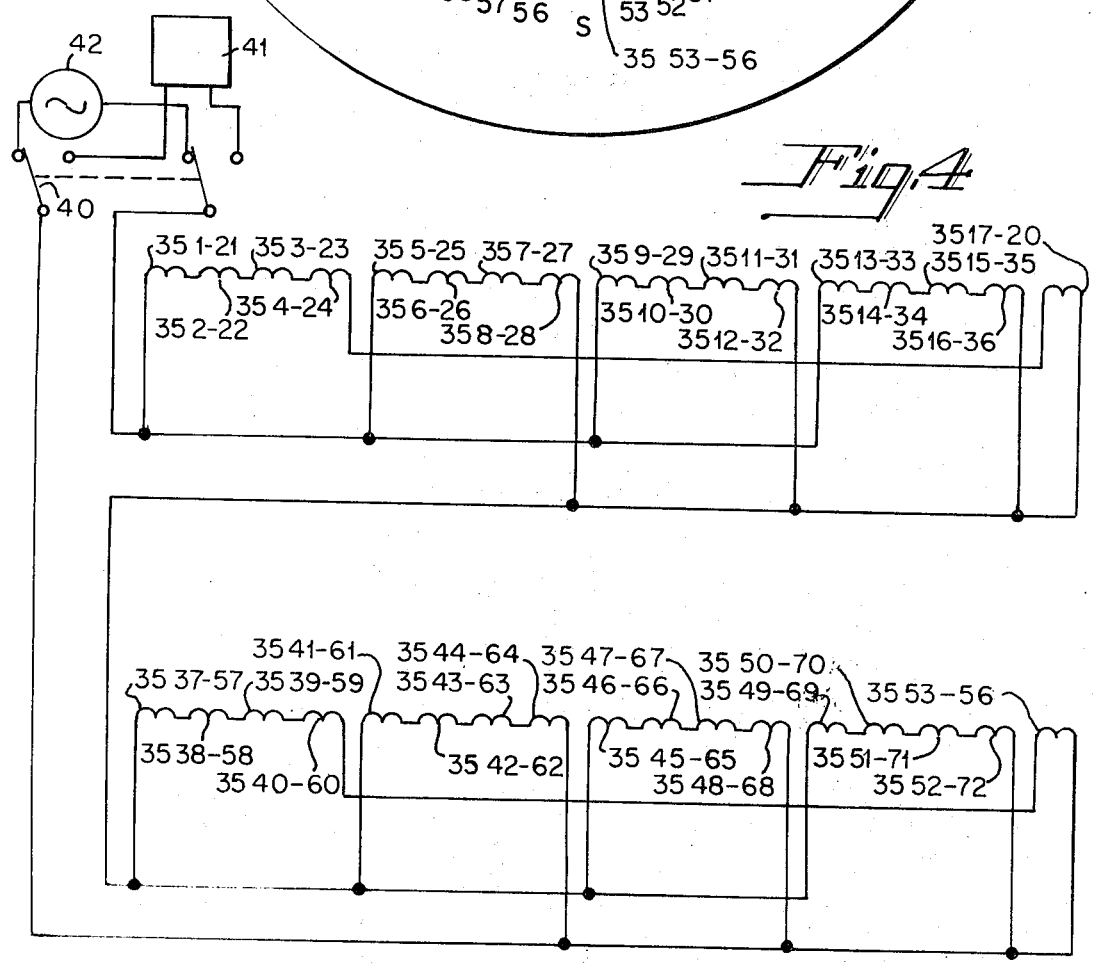
FIG. 4 is an electrical schematic diagram of the windings shown in FIG. 3.

As shown in FIG. 4, windings 35 were connected in a series-parallel arrangement in which the windings were connected four in series and then in parallel with the exception that the short windings between slots 17 and 20 and slots 53 and 56 were connected in series with four other windings. Coil 15 as a whole is connected through a double-pole, double-throw switch 40 to permit connection in one position of switch 40 of coil 15 to a variable potential DC source 41 and alternatively to an AC source 42. In this arrangement the maximum Direct Current demands are 120 Volts at 60 Amps. At an input voltage of 104 Volts DC coil 15 drew a current of 28 amperes (input power 2900 Watts) and the coil temperature was between 130° and 135°C. Flux density was measured in a test layer of 2¼ inch thickness of 1/16 inch steel shot and was found to vary between 2100 and 2200 gauss in the vicinity of slots 1 and 72 and slots 35 and 36 to between 2800 and 2900 gauss in the vicinity of slots 18 and 19 and slots 54 and 55. These represented the maximum and minimum readings. The flux density at the center of the filter medium was 2400 gauss.

The foregoing description is of a magnetic separator primarily designed to remove tramp iron from offset web black news ink. It will be appreciated that the magnetic separator of this invention is, however, broadly applicable to any fluid industrial product, for example, paints and varnishes as well as to less viscous fluids, as well, such as air, water and the like, wherever there is a problem of contamination by ferromagnetic particles.

We claim:

1. A magnetic separator including means defining a chamber having fluid inlet means to said chamber and fluid outlet means from said chamber, a ferromagnetic filter disposed across said chamber between said fluid inlet means and said fluid outlet means, an annular electromagnet having a gap surrounding said chamber adjacent the location of said filter and extending across said chamber transverse to the direction of flow through said filter between said fluid inlet means and said fluid outlet means, a pair of lengthwise radial slots in the inner surface of said electromagnet disposed about one side of said gap, a pair of lengthwise radial slots in the inner surface of said electromagnet disposed on the other side of said gap, and an electromagnetic coil including a winding disposed between said first named pair of radial slots on one side of said electromagnet and a winding disposed between said second named pair of slots on the opposite side of said electromagnet, said windings being connected in opposing polarity whereby when said coil is energized a magnetic field is established across said gap in said filter transverse to said direction of flow through said filter.

2. A magnetic separator according to claim 1 which further includes means for applying a DC potential across said coil.

3. A magnetic separator according to claim 1 which further includes means for applying an AC potential across said coil.

4. A magnetic separator according to claim 1 in which said filter is a bed of ferromagnetic particles.

5. A magnetic separator according to claim 4 in which said particles are steel shot.

6. A magnetic separator including means defining a chamber having fluid inlet means to said chamber and fluid outlet means from said chamber, a ferromagnetic filter disposed across said chamber between said fluid inlet means and said fluid outlet means, an annular electromagnet having a gap surrounding said chamber adjacent the location of said filter and extending across said chamber transverse to the direction of flow through said filter between said fluid inlet means and said fluid outlet means, a plurality of annular laminae, each said lamina including a plurality of radial slots in the inner surface thereof at arcuate intervals thereabout, said laminae being stacked together with said radial slots in registry to define slots extending through said electromagnet, and an electromagnetic coil including a winding disposed between a pair of lengthwise slots on one side of said electromagnet and a winding disposed between a pair of lengthwise slots on the opposite side of said electromagnet, said windings being connected in opposing polarity whereby when said coil is energized a magnetic field is established across said gap in said filter transverse to said direction of flow through said filter.

7. A magnetic separator according to claim 6 in which said electromagnet includes at least eight said radial slots extending lengthwise through said electromagnet in the inner surface thereof at arcuate intervals thereabout, and in which said coil includes at least two different windings each disposed between a pair of non-adjacent slots on one side of said electromagnet such that said windings overlap, and at least two other windings each disposed between a different pair of non-adjacent slots on the other side of said electromagnets such that said other windings overlap, said windings on said one side being connected to have a common polarity and said other windings on said other side being connected to have a common polarity opposite that of said windings on said one side.

* * * * *